(12) United States Patent  
Creeden et al.

(10) Patent No.: US 8,971,359 B2  
(45) Date of Patent: Mar. 3, 2015

(54) TEMPERATURE CONTROL OF A FIBER LASER SYSTEM

(75) Inventors: Daniel J. Creeden, Nashua, NH (US); Adam J. Marcinuk, Lyndeborough, NH (US); Chris L. Willis, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 100 days.

(21) Appl. No.: 13/809,467

(22) PCT Filed: Apr. 12, 2012

(86) PCT No.: PCT/US2012/033190  
§ 371 (c)(1),  
(2), (4) Date: Jan. 10, 2013

(87) PCT Pub. No.: WO2012/148682  
PCT Pub. Date: Nov. 1, 2012

(65) Prior Publication Data  
US 2013/0136146 A1    May 30, 2013

Related U.S. Application Data

(60) Provisional application No. 61/481,104, filed on Apr. 29, 2011.

(51) Int. Cl.  
*H01S 3/30* (2006.01)  
*H01S 3/04* (2006.01)  
(Continued)

(52) U.S. Cl.  
CPC .............. *H01S 3/04* (2013.01); *H01S 3/06704* (2013.01); *H01S 3/0675* (2013.01); *H01S 3/094053* (2013.01); *H01S 3/09415* (2013.01);  
(Continued)

(58) Field of Classification Search  
USPC ............... 372/6, 34, 36, 50.11, 102; 385/134  
See application file for complete search history.

(56) References Cited

U.S. PATENT DOCUMENTS 7,260,294 B2 *   8/2007   Kobayashi et al. ............. 385/37  
7,548,567 B2 *   6/2009   Kupershmidt et al. ......... 372/34  
(Continued)

OTHER PUBLICATIONS

Sijan, Development of Military Lasers for Optical Countermeasures in the MId-IR, SPIE, vol. 7483, 748304, 14 pages, 2009, Retrieved on Jul. 13, 2012 from the Internet.

*Primary Examiner* — Armando Rodriguez  
(74) *Attorney, Agent, or Firm* — Finch & Maloney PLLC; Daniel J. Long (57) ABSTRACT

Techniques and architecture are disclosed for controlling the temperature of a fiber laser system. In some embodiments, a single thermoelectric cooler (TEC) may be utilized to control the temperature of multiple system components. In some embodiments, a TEC may be physically/thermally coupled to a laser diode, which in turn may be physically/thermally coupled with a mounting plate to which one or more fiber grating holders are physically/thermally coupled, and an optical fiber that is operatively coupled with the laser diode may be physically/thermally coupled with the one or more fiber grating holders. In some embodiments, this may provide a thermal pathway/coupling between the optical fiber (e.g., its fiber grating(s)), and the TEC. In some embodiments, this may reduce/minimize the quantity of temperature control components, reduce system size/complexity, increase system dependability, and/or increase system performance/efficiency. Numerous configurations and variations will be apparent in light of this disclosure.

25 Claims, 5 Drawing Sheets

(51) Int. Cl.
*H01S 3/067* (2006.01)
*H01S 3/094* (2006.01)
*H01S 3/042* (2006.01)
*G02B 6/02* (2006.01)
*H01S 3/0941* (2006.01)
*H01S 3/16* (2006.01)

(52) U.S. Cl.
CPC ............ *H01S3/1618* (2013.01); *H01S 3/0405* (2013.01); *H01S 3/042* (2013.01); *G02B 6/0218* (2013.01)

USPC .................................. 372/6; 372/34; 372/36

(56) References Cited

U.S. PATENT DOCUMENTS

| | | | |
|---|---|---|---|
| 7,768,700 B1* | 8/2010 | Savage-Leuchs | 359/341.1 |
| 7,899,105 B1* | 3/2011 | Hargis et al. | 372/102 |
| 2002/0131674 A1* | 9/2002 | Hung | 385/16 |
| 2005/0031003 A1* | 2/2005 | Krupke | 372/56 |
| 2011/0026558 A1* | 2/2011 | Raju et al. | 372/50.1 |

* cited by examiner

TEMPERATURE CONTROL OF A FIBER LASER SYSTEM

CROSS-REFERENCE TO RELATED APPLICATIONS

This application claims the benefit of and priority to U.S. Provisional Patent Application No. 61/481,104, filed on Apr. 29, 2011, which is herein incorporated by reference in its entirety.

FIELD OF THE DISCLOSURE

The invention relates to lasers, and more particularly to temperature control of a fiber laser system.

BACKGROUND

Laser system design involves a number of non-trivial challenges, and fiber laser systems have faced particular complications, such as those with respect to temperature control. Continued device/system scaling will tend to exacerbate such problems.

SUMMARY

One embodiment of the present invention provides an apparatus including an elongate body of thermally conductive material having at least one channel formed therein, wherein the at least one channel is configured to receive a fiber Bragg grating of an optical fiber, and wherein a depth of the channel is greater than or equal to a diameter of the optical fiber. In some cases, the thermally conductive material comprises a thermally conductive metal, a thermally conductive composite, and/or a thermally conductive ceramic. In some cases, the apparatus further includes the fiber Bragg grating of the optical fiber. In some cases, the channel is configured to receive a quantity of thermally conductive adhesive/sealant disposed therein. In some such cases, the thermally conductive adhesive/sealant comprises a thermally conductive epoxy or a thermally conductive thermoplastic/thermoset. In some cases, the elongate body comprises two such channels aligned parallel one another. In some cases, the at least one channel is U-shaped or V-shaped.

Another embodiment of the present invention provides a system including a fiber laser comprising a laser diode and an optical fiber operatively coupled to the laser diode, wherein the optical fiber includes at least one fiber Bragg grating, a thermal control component physically and/or thermally coupled with the laser diode, and at least one fiber grating holder physically and/or thermally coupled with the laser diode, wherein the at least one fiber grating holder comprises an elongate body of thermally conductive material having at least one channel formed therein and configured to receive the at least one fiber Bragg grating of the optical fiber, and wherein a depth of the at least one channel is greater than or equal to a diameter of the optical fiber. In some cases, the laser diode comprises a Yb-doped laser medium or a Tm-doped laser medium. In some cases, the optical fiber comprises silica glass fiber, phosphate glass fiber, fluoride glass fiber, chalcogenide glass fiber, and/or germanate glass fiber. In some cases, the thermal control component comprises a thermoelectric cooler, an air-cooled heat exchanger, or a water-cooled cold plate. In some cases, the at least one fiber grating holder comprises a thermally conductive metal, a thermally conductive composite, and/or a thermally conductive ceramic. In some cases, the at least one channel is configured to receive a quantity of thermally conductive adhesive/sealant therein. In some such cases, the thermally conductive adhesive/sealant comprises a thermally conductive epoxy or a thermally conductive thermoplastic/thermoset. In some cases, the optical fiber includes a first fiber Bragg grating and a second fiber Bragg grating, and wherein the system comprises a single fiber grating holder configured to receive both the first and second fiber Bragg gratings. In some cases, the optical fiber includes a first fiber Bragg grating and a second fiber Bragg grating, and wherein the system comprises a first fiber grating holder configured to receive the first fiber Bragg grating and a second fiber grating holder configured to receive the second fiber Bragg grating. In some cases, the first fiber Bragg grating comprises a high-reflectivity fiber Bragg grating and the second fiber Bragg grating comprises a partial-reflectivity fiber Bragg grating. In some such cases, the system further includes a gain fiber operatively coupled to the optical fiber, wherein the gain fiber comprises a core that has been doped with a rare earth element, and wherein the gain fiber is disposed between the high-reflectivity fiber Bragg grating and the partial-reflectivity fiber Bragg grating of the optical fiber. In some cases, the system further includes a heat spreader physically and thermally coupled with at least one of the laser diode and/or thermal control component. In some such cases, the heat spreader comprises an arrangement of foils of indium, copper, and/or alloys thereof. In some cases, the system at least one of reduces the number of thermoelectric coolers to be implemented within the system, provides for use of a single thermoelectric cooler to control laser diode temperature and/or fiber Bragg grating temperature, reduces system size/bulk, footprint, and/or weight, reduces system power consumption, reduces system design complexity, reduces system interfacing complexity, increases system dependability, increases system efficiency, increases precision of signal wavelength(s) emitted by the system, and/or decreases likelihood of performance degradation caused by failure to set proper temperature settings as a result of human error and/or equipment malfunction. In some cases, the system further includes a Ho:YAG laser crystal and/or a non-linear converter, wherein the Ho:YAG laser crystal and/or non-linear converter are pumped by the fiber laser. In some cases, the system further includes a mounting plate physically and/or thermally coupled with the laser diode and/or the heat spreader, wherein the at least one fiber grating holder is physically and/or thermally coupled with the mounting plate.

Another embodiment of the present invention provides a system including a fiber laser comprising a laser diode comprising a Yb-doped laser medium or a Tm-doped laser medium and an optical fiber operatively coupled to the laser diode, wherein the optical fiber comprises silica glass fiber, phosphate glass fiber, fluoride glass fiber, chalcogenide glass fiber, and/or germanate glass fiber, and wherein the optical fiber includes a high-reflectivity fiber Bragg grating, a partial-reflectivity fiber Bragg grating, and a gain fiber there between, a thermoelectric cooler physically and/or thermally coupled with the laser diode, a mounting plate physically and/or thermally coupled with the laser diode, a first fiber grating holder physically and/or thermally coupled with the mounting plate, wherein the first fiber grating holder comprises an elongate body of thermally conductive material having a channel formed therein, wherein the channel is configured to receive the high-reflectivity fiber Bragg grating and to receive a quantity of a thermally conductive epoxy or a thermally conductive thermoplastic/thermoset therein, and wherein a depth of the channel, is greater than or equal to a diameter of the optical fiber, and a second fiber grating holder physically and/or thermally coupled with the mounting plate, wherein the second fiber grating holder comprises an elongate body of thermally conductive material having a channel formed therein, wherein the channel is configured to receive the partial-reflectivity fiber Bragg grating and to receive a quantity of a thermally conductive epoxy or a thermally conductive thermoplastic/thermoset therein, and wherein a depth of the channel is greater than or equal to the diameter of the optical fiber. In some cases, the system further includes a Ho:YAG laser crystal and/or a non-linear converter, wherein the Ho:YAG laser crystal and/or non-linear converter are pumped by the fiber laser.

The features and advantages described herein are not all-inclusive and in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Techniques and architecture are disclosed for controlling the temperature of a fiber laser system. In some embodiments, a single thermoelectric cooler (TEC) may be utilized to control the temperature of multiple system components. In some embodiments, a TEC may be physically/thermally coupled to a laser diode, which in turn may be physically/thermally coupled with a mounting plate to which one or more fiber grating holders are physically/thermally coupled, and an optical fiber that is operatively coupled with the laser diode may be physically/thermally coupled with the one or more fiber grating holders. In some embodiments, this may provide a thermal pathway/coupling between the optical fiber (e.g., its fiber grating(s)), and the TEC. In some embodiments, this may reduce/minimize the quantity of temperature control components, reduce system size/complexity, increase system dependability, and/or increase system performance/efficiency. Numerous configurations and variations will be apparent in light of this disclosure.

General Overview

As will be appreciated, some laser systems require temperature control/management of their constituent components to ensure sufficient stability of the output wavelength(s). In some cases, the temperature of each individual component of a laser system is managed separately by an associated thermoelectric cooler (TEC)—a thermoelectric device that functions as a heat pump; that is, when direct current runs through a TEC, it creates a temperature difference whereby heat is moved from one side of the TEC to the other. A TEC may use this phenomenon (known as the Peltier effect) to create a heat flux between the junction of two different types of materials. When a current is made to flow through a thermoelectric circuit, heat is evolved at an upper junction and absorbed at a lower junction, for example.

However, such laser systems which implement individual TECs for each system component requiring temperature control/management suffer from a number of non-trivial issues and complications, such as, but not limited to: (1) significant system size/bulk, footprint, and/or weight; (2) reduced system dependability, given that there are more components which may malfunction and/or degrade over time; (3) reduced system efficiency, given that imprecise control/management has a measurable effect on the emitted signal; (4) overly complex system design and/or system interfacing requirements, given that each TEC may require its own set-point temperature; and/or (5) increased likelihood of performance degradation, given that individual TECs may fail to be set to the proper temperature settings as a result of human error and/or equipment malfunction. Other inherent complications/non-trivial issues associated with laser system designs implementing individual TECs for each system component requiring temperature control/management will be apparent in light of this disclosure.

Therefore, there is need for techniques for providing thermal control/management while reducing the number of laser system components and/or minimizing complications attendant conventional designs/methodologies.

Thus, and in accordance with an embodiment of the present invention, techniques and architecture are disclosed for providing temperature control/management of a fiber laser system while minimizing the number of temperature control components (e.g., TECs) in the system. For instance, some embodiments of the present invention may provide a fiber laser system implementing only a single TEC to control/manage the temperature of multiple fiber laser system components. As will be appreciated, and in accordance with an embodiment, a reduction in the number of temperature control/management components (e.g., TECs) in a given fiber laser system may provide for advantages/benefits such as, but not limited to: (1) a reduction in system size/bulk, footprint, and/or weight; (2) an increase in system dependability, given that there are fewer components which may malfunction and/or degrade over time; (3) an increase in overall system efficiency (e.g., more precise signal wavelengths emitted; a reduction in power consumption by the system); (4) a reduction the complexity of system design and/or interfacing; and/or (5) a decrease in the likelihood of performance degradation which otherwise may result from failure to set proper temperature settings (e.g., as a result of human error and/or equipment malfunction). Furthermore, some embodiments may allow for the use of fiber gratings in high-powered lasers without the need to include additional TECs and/or other temperature control/management componentry.

System Architecture and Operation

Figure 1A:
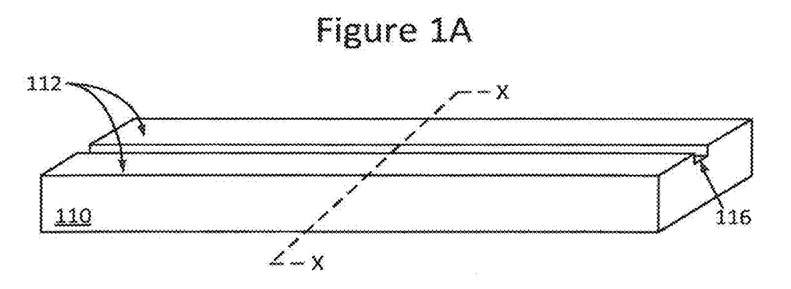
FIG. 1A illustrates a perspective view of a fiber grating holder configured in accordance with an embodiment of the present invention.

FIG. 1A illustrates a perspective view of a fiber grating holder 110 configured in accordance with an embodiment of the present invention. Fiber grating holder 110 may comprise a thermally conductive material (e.g., a metal, composite, ceramic, etc.). For example, m some embodiments, fiber grating holder 110 may comprise a thermally conductive metal, such as, but not limited to: (1) steel; (2) aluminum; (3) copper; and/or (4) alloys thereof. Other suitable materials for fiber grating holder 110 will depend on a given application and will be apparent in light of this disclosure.

As can be seen from FIG. 1A, in one specific example embodiment fiber grating holder 110 may be configured, for instance, as a substantially rectangular block of thermally conductive material. However, the claimed invention is not so limited; for example, in some other embodiments, fiber grating holder 110 may be of any given geometry (e.g., cylindrical, prismatic, polyhedral, cuboid, etc.) that provides sufficient thermal contact suitable for a given application. As can further be seen, one or more surfaces (e.g., upper surface 112) of fiber grating holder 110 may be configured, at least in part, to be planar and/or non-planar.

Furthermore, and in accordance with an embodiment, fiber grating holder 110 may be of any given dimensions (e.g., length, width, depth, etc.) suitable for a given application. For instance, in some embodiments fiber grating holder 110 may be configured to have a length that is less than or equal to about 30% (e.g., in the range of about 10-20%) longer than the fiber grating(s) 212, discussed in detail below with reference to FIGS. 2A and 2B, that it is to hold. For example, in one specific example embodiment, if a given fiber grating 212 has a length of about 40 mm, then the fiber grating holder 110 may have a length of about 50 mm. In some cases, this may help to minimize the mass of fiber grating holder 110, in accordance with an embodiment. Other suitable materials and/or geometries of fiber grating holder 110 will depend on a given application and will be apparent in light of this disclosure.

Figure 1B:
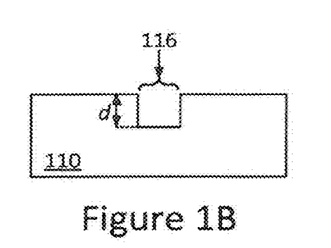
FIG. 1B illustrates a cross-section view of the fiber grating holder of FIG. 1A taken along dashed line X-X therein.

FIG. 1B illustrates across-section view of the fiber grating holder 110 of FIG. 1A taken along dashed line X-X therein. As can be seen, a channel 116 may be formed in or otherwise made integral with fiber grating holder 110. As will be appreciated, channel 116 may be formed in fiber grating holder 110 by conventional techniques (e.g., CNC machining). In accordance with an embodiment, channel 116 may be of any given dimensions (e.g., length, width, depth, etc.) and/or geometry (e.g., U-shaped, V-shaped, etc.) suitable for a given application. In some embodiments, the profile of a channel 116 may remain substantially uniform (e.g., to maintain substantially uniform heat transfer), whereas in some other embodiments, a given channel 116 may have a substantially non-uniform profile (e.g., one or more of the dimensions and/or the geometry of the channel 116 may be made to fluctuate/vary to achieve varying degrees of thermal transfer). In some cases, the dimensions and/or geometry of a given channel 116 may be chosen, at least in part, based on: (1) the dimensions and/or geometry of fiber grating holder 110; and/or (2) the configuration of the optical fiber 210, discussed in detail below with reference to FIGS. 2A and 2B, to be received therein. For instance, in one specific example embodiment, a channel 116 may be configured to have at least one dimension (e.g., depth d) that is greater than or equal to the width/diameter of optical fiber 210 (e.g., fiber with coating having a width/diameter in the range of about 250-500 µm, or greater).

Figure 1C:
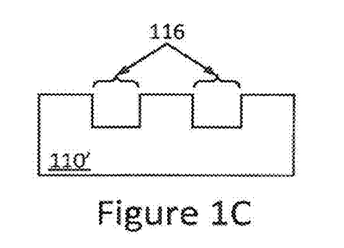
FIG. 1C illustrates a cross-section view of a fiber grating holder configured in accordance with an embodiment of the present invention.

FIG. 1C illustrates a cross-section view of a fiber grating holder 110' configured in accordance with an embodiment of the present invention. As can be seen, in some cases a fiber grating holder 110' may be configured with multiple channels 116 (e.g., 2-4, or more) to accommodate: multiple portions of a single optical fiber 210 and/or multiple optical fibers 210. As will be appreciated, the number and/or dimensions of channels 116 provided may be customizable for a given application, thus allowing for multiple fiber gratings 212, discussed in detail with reference to FIGS. 2A and 2B, to be implemented with a single fiber grating holder 110', in accordance with an embodiment. Furthermore, in some embodiments, the plurality of channels 116 may be of homogeneous profile (e.g., all channels 116 may have the same dimensions/geometry), while m some other embodiments the channels 116 may be of non-homogeneous profile (e.g., the dimensions and/or geometry of one channel 116 may be made different from another channel 116). Other suitable configurations of fiber grating holders 110/110' will depend on a given application and will be apparent in light of this disclosure.

Figure 2A:
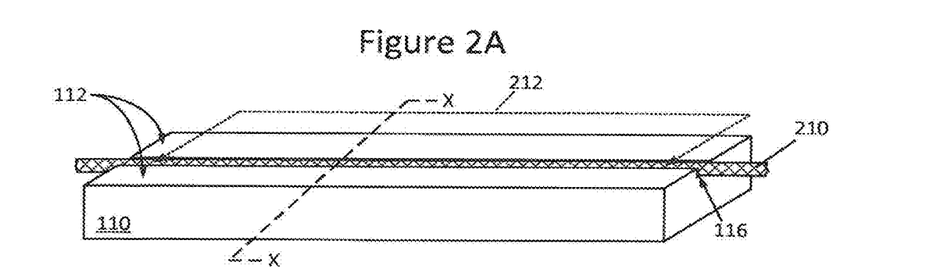
FIG. 2A illustrates a perspective view of a fiber grating holder configured in accordance with an embodiment of the present invention.
Figure 2B:
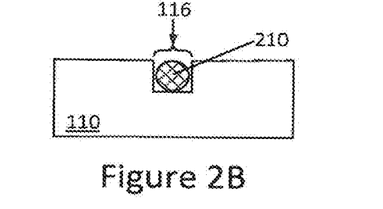
FIG. 2B illustrates a cross-section view of the fiber grating holder of FIG. 2A taken along dashed line X-X therein.

FIG. 2A illustrates a perspective view of a fiber grating holder 110 configured in accordance with an embodiment of the present invention, and FIG. 2B illustrates a cross-section view of the fiber grating holder 110 of FIG. 2A taken along dashed line X-X therein. As can be seen, a given channel 116 of fiber grating holder 110 may be configured to receive, in whole or in part, an optical fiber 210. In some embodiments, a given channel 116 may be of suitable dimensions to permit optical fiber 210 to be disposed/provided therein without, for example, protruding/extending above an upper surface 112 of fiber grating holder 110. In some such cases, this may help, for example, ensure sufficient space for inclusion of a thermally conductive sealant 130, discussed in detail below with reference to FIGS. 3A and 3B, within at least a portion of channel 116.

In accordance with an embodiment, optical fiber 210 may be any optical fiber component that is capable of having a fiber Bragg grating (FBG) defined/written therein. In some embodiments, optical fiber 210 may comprise, for example: (1) silica glass fiber; (2) phosphate glass fiber; (3) fluoride glass fiber; (4) chalcogenide glass fiber; and/or (5) germanate glass fiber. For instance, in one specific example embodiment, optical fiber 210 may be a thulium-doped fiber laser (Tm:FL) implementing silica glass fiber. Note, however, that the claimed invention is not intended to be limited to any particular fiber laser and/or optical fiber componentry, and instead may be used in numerous applications with numerous configurations, as will be apparent in light of this disclosure.

In some embodiments, optical fiber 210 may be configured, for example, with a grating region 212 (e.g., a FBG). Grating region 212 may have a length, for example, in the range of about 2-50 mm, or greater. Therefore, in some embodiments, grating region 212 may occupy less than about 80% (e.g., in the range of about 30-75%) of the portion of optical fiber 210 disposed within channel 116. However, the claimed invention is not so limited; for example, and in accordance with an embodiment, fiber grating holder 110/110' (and thus one or more attendant channels 116) may be configured to match exactly (or otherwise be within an acceptable tolerance of) the length of a given grating region 212.

Figure 3A:
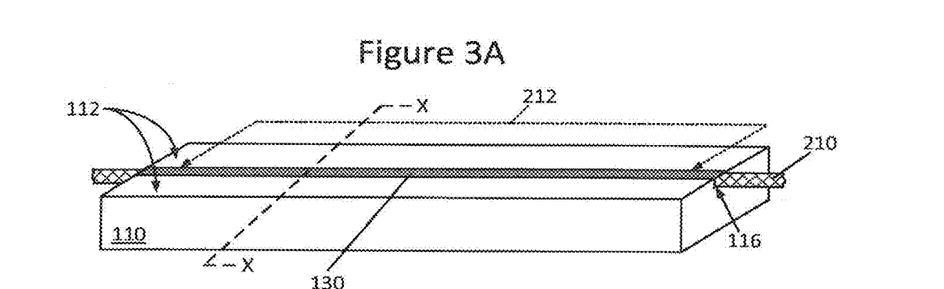
FIG. 3A illustrates a perspective view of a fiber grating holder configured in accordance with an embodiment of the present invention.
Figure 3B:
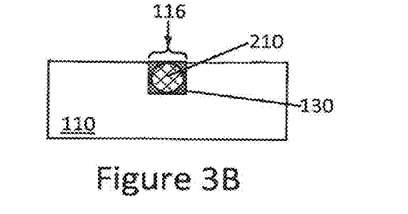
FIG. 3B illustrates a cross-section view of the fiber grating holder of FIG. 3A taken along dashed line X-X therein.

FIG. 3A illustrates a perspective view of a fiber grating holder 110 configured in accordance with an embodiment of the present invention, and FIG. 3B illustrates a cross-section view of the fiber grating holder 110 of FIG. 3A taken along dashed line X-X therein. As can be seen, a quantity of thermally conductive adhesive/sealant 130 may be disposed within channel 116 to cover/surround a portion of optical fiber 210 (e.g., grating region 212) positioned/disposed therein. In accordance with an embodiment, thermally conductive adhesive/sealant 130 may be chosen, at least in part, based on its ability to provide sufficient structural hold and/or thermal contact. Thus, and in accordance with a specific example embodiment, thermally conductive adhesive/sealant 130 may be a thermally conductive soft epoxy (e.g., NuSil CV-2946 thermally conductive silicone) and/or a thermally conductive thermoplastic/thermoset (e.g., Diemat DM4130SM/J147 silver-loaded polymeric paste). Other suitable thermally conductive sealants/adhesives 130 will depend on a given application and will be apparent in light of this disclosure.

Figure 4A:
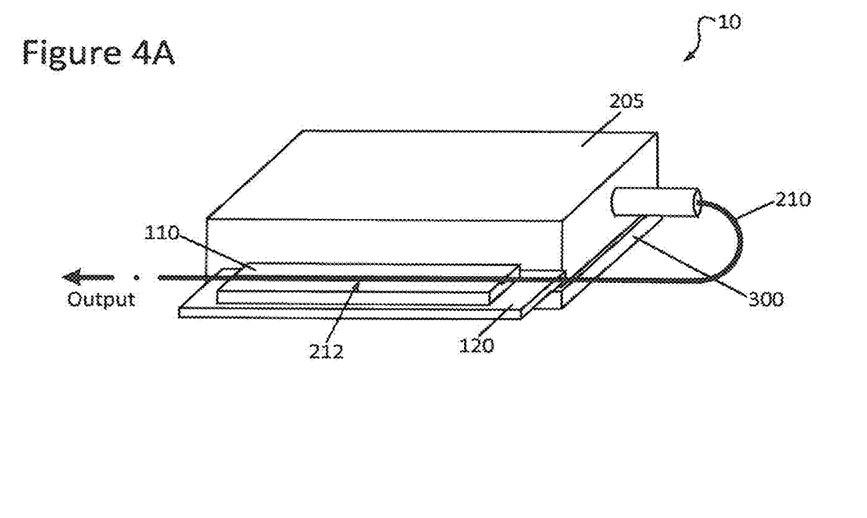
FIG. 4A illustrates a perspective view of an example fiber laser system configured in accordance with an embodiment of the present invention.

FIG. 4A illustrates a perspective view of an example fiber laser system 10 configured in accordance with an embodiment of the present invention. As can be seen, fiber laser system 10 may comprise, for example, one or more laser diodes 205, an optical fiber 210, a thermoelectric cooler (TEC) 300, a fiber grating holder 110, and, optionally, a mounting plate 120. Fiber laser system 10 may include additional, fewer, and/or different elements or components from those here described, as will be appreciated in light of this disclosure. The claimed invention is not intended to be limited to any particular fiber laser system configurations, but can be used with numerous configurations in numerous applications, as will be appreciated in light of this disclosure.

As will be appreciated, and in accordance with an embodiment, the type of laser diode 205 may be chosen, at least in part, based on the output power desired and/or the optical fiber 210 to be implemented. Thus, in some embodiments, laser diode 205 may emit, for example, in the range of about 915-975 nm (e.g., for an Yb-doped laser medium) or in the range of about 780-800 nm or about 1500-1700 nm (e.g., for a Tm-doped laser medium). As will further be appreciated in light of this disclosure, the claimed invention is not intended to be limited to implementation of only a single laser diode 205; for instance, and in accordance with an embodiment, multiple laser diodes 205 may be, for example, fiber-combined and implemented in a given laser system (e.g., system 10, 10', and/or 20, described in detail below). In some embodiments, a given laser diode 205 may be physically and/or thermally coupled, for example, with a TEC 300 (or other temperature control/management componentry) discussed in detail below. Other suitable configurations for laser diode 205 will depend on a given application and will be apparent in light of this disclosure.

As can further be seen from FIG. 4A, fiber laser system 10 may include a TEC 300 or other temperature control/management componentry (e.g., an air-cooled heat exchanger, a water-cooled cold plate, etc.). As will be appreciated, TEC 300 may be implemented as conventionally done. As previously noted, and in accordance with an embodiment, a single TEC 300 may be implemented, for example, to control/manage the temperature of multiple fiber laser system components (e.g., laser diodes 205, fiber gratings 212, etc.). Other suitable configurations for TEC 300 will depend on a given application and will be apparent in light of this disclosure.

As can further be seen from FIG. 4A, fiber laser system 10 may include one or more fiber grating holders 110 (and/or 110'), which, in some embodiments, optionally may be physically and/or thermally coupled, for example, with one or more mounting plates 120. In accordance with an embodiment, a given optional mounting plate 120 may comprise, for example, a thermally conductive material (e.g., a metal, composite, ceramic, etc.). For instance, in some embodiments, mounting plate 120 may comprise a thermally conductive metal, such as, but not limited to (1) steel; (2) aluminum; (3) copper; and/or (4) alloys thereof. As can be seen from the specific example embodiment depicted in FIG. 4A, mounting plate 120 may be configured, for instance, as a substantially planar plate of thermally conductive material. However, the claimed invention is not so limited; for example, in some other embodiments, mounting plate 120 may be of any given dimensions (e.g., length, width, depth, etc.) and/or geometry (e.g., cylindrical, prismatic, polyhedral, cuboid, etc.) suitable for a given application. Other suitable materials, dimensions, and/or geometries of optional mounting plate 120 will depend on a given application and will be apparent in light of this disclosure.

As can further be seen from FIG. 4A, in some embodiments the one or more mounting plates 120 may be physically and/or thermally coupled, for example, with laser diode 205. A given mounting plate 120 may be so coupled using any suitable means for achieving/maintaining such coupling (e.g., bolted on, bracket mounting, custom interface, etc.).

Figure 4B:
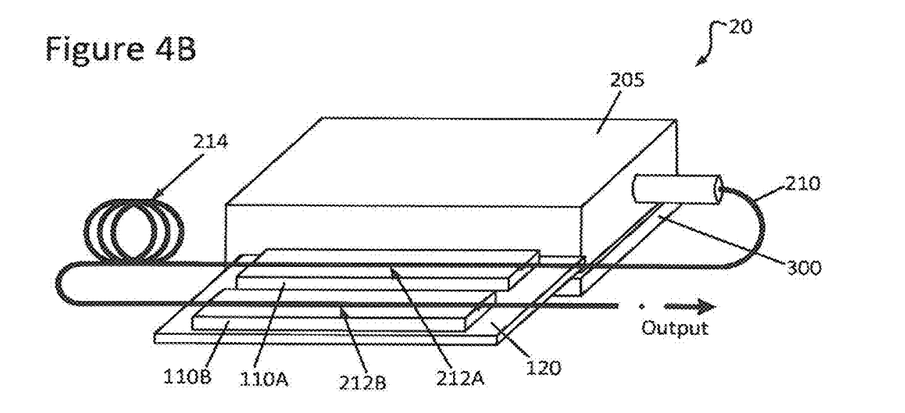
FIG. 4B illustrates a perspective view of an example fiber laser system configured in accordance with an embodiment of the present invention.

FIG. 4B illustrates a perspective view of an example fiber laser system 20 configured in accordance with an embodiment of the present invention. As can be seen, fiber laser system 20 may be configured in much the same way as fiber laser system 10 (e.g., laser diode 205, optical fiber 210, TEC 300, optional mounting plate 120), discussed in detail above with reference to FIG. 4A, and optionally may include different/additional components, such as, but not limited to: multiple fiber grating holders 110A/110B; multiple fiber gratings 212A/212B; a gain fiber 214; and/or a cladding stripper. Fiber laser system 20 may include additional, fewer, and/or different elements or components from those here described, as will be appreciated in light of this disclosure. The claimed invention is not intended to be limited to any particular fiber laser system configurations, but can be used with numerous configurations in numerous applications, as will be appreciated in light of this disclosure.

In accordance with an embodiment, any number of fiber grating holders 110 (e.g., fiber grating holders 110A, 110B, etc.) may be provided for a given number of fiber gratings 212 (e.g., fiber gratings 212A, 212B, etc.) to be implemented in optical fiber 210. For instance, as can be seen in the specific example embodiment depicted in FIG. 4B, a pair of fiber grating holders 110A and 110B may be provided, for example, for a corresponding pair of fiber gratings 212A and 212B, respectively. As will be appreciated, fiber grating holders 110A and 110B need not be arranged in the depicted side-by-side/parallel configuration, but may be arranged in any desired configuration suitable for a given application. Note, however, that the claimed invention is not so limited; for instance, in another specific example embodiment, a single fiber grating holder 110' having multiple channels 116 may be provided for a plurality of fiber gratings 212 (e.g., fiber gratings 212A, 212B, etc.).

As can further be seen in FIG. 4B, in some embodiments, multiple fiber grating holders 110 (e.g., fiber grating holders 110A, 110B, etc.) may be physically and/or thermally coupled with a single optional mounting plate 120. However, the claimed invention is not so limited, as multiple mounting plates 120 alternatively may be optionally implemented in accordance with an example embodiment. As will be appreciated, the multiple fiber grating holders 110A, 110B, etc., may be positioned/arranged in any desired configuration (e.g., linear, parallel, staggered, random, etc.) on the one or more optional mounting plates 120, in accordance with an embodiment.

As can further be seen from FIG. 4B, in some embodiments the one or more mounting plates 120 may be physically and/or thermally coupled, for example, with laser diode 205, in much the same was as previously discussed with reference to FIG. 4A. A given mounting plate 120 may be so coupled using any suitable means for achieving/maintaining such coupling (e.g., bolted on, bracket mounting, custom interface, etc.).

As can further be seen from FIG. 4B, in some embodiments a gain fiber 214 optionally may be included. In some such cases, optional gain fiber 214 may be configured with a core that has been doped with a rare earth element (e.g., Yb, Er, Tb, Ho, Dy, etc.). In accordance with an embodiment, optional gain fiber 214 may be of any desired dimensions (e.g., fiber with coating having a width/diameter in the range of about 250-500 µm, or greater) suitable for a given application. For instance, in one specific example embodiment, gain fiber 214 may comprise a 25 µm Tm-doped silica glass core having a cladding in the range of about 250 µm and a numerical aperture of about 0.1. In some embodiments, optional gain fiber 214 may be positioned downstream, for example, of a first fiber grating 212A (e.g., a high-reflectivity grating, discussed in detail below) and/or upstream of a second fiber grating 212B (e.g., a partial-reflectivity grating, discussed in detail below). Other suitable types/configurations of optional gain fiber 214 will depend on a given application and will be apparent in light of this disclosure.

As previously noted, in some embodiments, fiber laser system 20 optionally may include, for example, a high-reflectivity grating 212A. In some such embodiments, high-reflectivity grating 212A may be configured, for example, to reflect greater than or equal to about 97% of the incident wavelength band (e.g., for a Yb-doped laser medium, in the range of about 1000-1100 nm; for a Tm-doped laser medium, in the range of about 1800-2100 nm) and/or have a spectral width, for example, in the range of about 0.1-10 nm (e.g., less than or equal to about 5 nm) or as otherwise desired. In one specific example embodiment, optional high-reflectivity grating 212A may be a 25 µm Ge-doped silica glass core having a cladding in the range of about 250 µm and a numerical aperture of about 0.1. Other suitable configurations for high-reflectivity grating 212A will depend on a given application and will be apparent in light of this disclosure.

Furthermore, as previously noted, in some embodiments, fiber laser system 20 optionally may include, for example, a partial-reflectivity grating 212B. In some such embodiments, partial-reflectivity grating 212B may be configured, for example, to reflect about 3-70% of the incident wavelength band and/or spectrally overlap with high-reflectivity grating 212A. For example, in some embodiments, the spectral width of both high-reflectivity grating 212A and partial-reflectivity grating 212B may match perfectly, while in some other embodiments the spectral width of gratings 212A and 212B may be offset from one another within a tolerable range (e.g., high-reflectivity grating 212A may have a spectral width of about 2-3 nm while partial-reflectivity grating 212B may have a spectral width of about 0.3 nm). In one specific example embodiment, optional partial-reflectivity grating 212B may be a 25 µm Ge-doped silica glass core having a cladding in the range of about 250 µm and a numerical aperture of about 0.1. Other suitable configurations for partial-reflectivity grating 212B will depend on a given application and will be apparent in light of this disclosure.

In some embodiments, fiber laser system 20 optionally may include, for example, a cladding stripper implemented downstream of partial-reflectivity grating 212B. For instance, in one specific example embodiment, the optional cladding stripper may comprise a high-refractive-index material deposited directly on the cladding of the optical fiber 210 (e.g., the coating layer protecting the optical fiber 210 is omitted). Consequently, in some such cases, the only light propagating within optical fiber 210 may be confined to the core after passing through the optional cladding stripper. Other suitable cladding stripper configurations will depend on a given application and will be apparent in light of this disclosure.

Figure 5A:
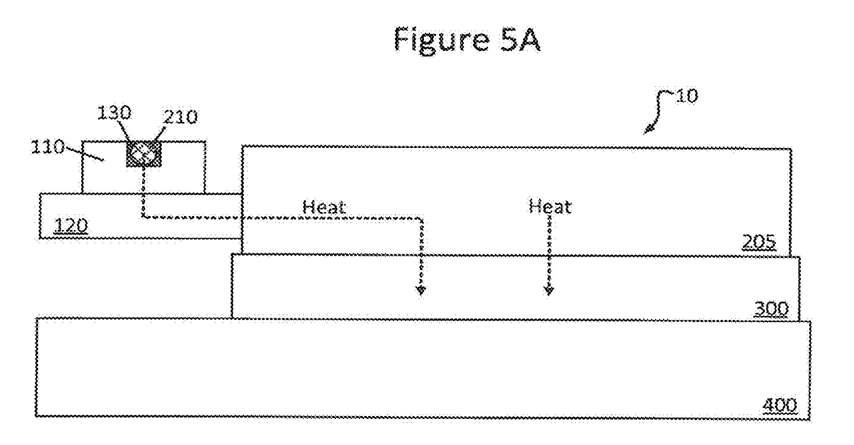
FIG. 5A illustrates a cross-section view of an example fiber laser system configured in accordance with an embodiment of the present invention.

FIG. 5A illustrates a cross-section view of an example fiber laser system 10 configured in accordance with an embodiment of the present invention. As can be seen from FIG. 5A, fiber laser system 10 may be physically coupled with a chassis 400 or other suitable mounting surface/locus (e.g., an optical bench or similar platform, etc.) to provide structural stability to fiber laser system 10. Other suitable configurations for chassis 400 will depend on a given application and will be apparent in light of this disclosure.

As will be appreciated, an optical fiber 210 may undergo an increase in temperature during its use (e.g., as a signal/laser light is propagated therethrough). As previously noted, the performance of a given fiber laser system implementing such an optical fiber 210 (e.g., the stability of its output) may decline, for example, with an increase in temperature of its componentry. Thus, and in accordance with an embodiment, the temperature of an optical fiber 210 may be controlled/managed by providing a thermal pathway from the optical fiber 210 (e.g., a heat source) to TEC 300 (e.g., a heat exchange interface). In some embodiments, such a thermal pathway may be provided, for example, by implementing a fiber laser system 10 that satisfies the following conditions: (1) optical fiber 210 is thermally coupled with fiber grating holder 110 (e.g., by physical contact in channel 116 and/or by utilizing a thermally conductive sealant 130 therein); (2) fiber grating holder 110 is thermally coupled with optional mounting plate 120; (3) optional mounting plate 120 is thermally coupled with laser diode 205; and (4) laser diode 205 is thermally coupled with TEC 300. Other suitable configurations for provision of a sufficient thermal pathway in fiber laser system 10 will depend on a given application and will be apparent in light of this disclosure. For example, in some embodiments, an optional mounting plate 120 is not provided, and the fiber grating holder 110 is instead physically and/or thermally coupled directly with the laser diode 205.

Figure 5B:
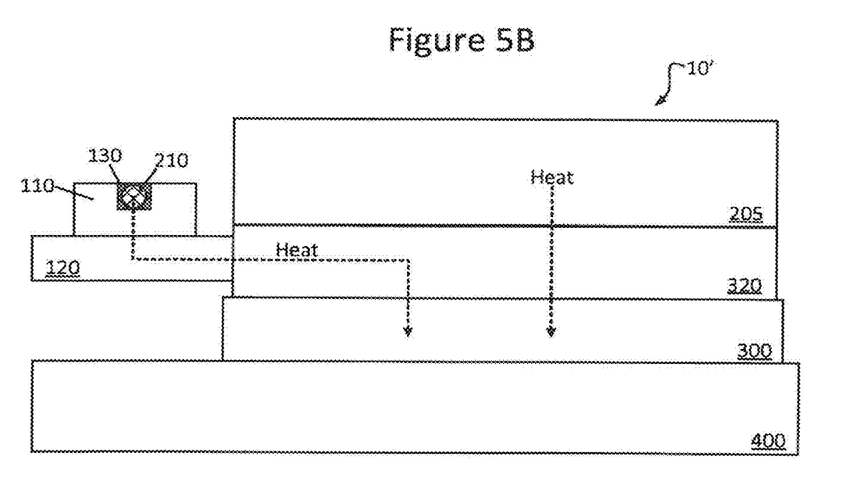
FIG. 5B illustrates a cross-section view of an example fiber laser system configured in accordance with an embodiment of the present invention.

FIG. 5B illustrates a cross-section view of an example fiber laser system 10' configured in accordance with an embodiment of the present invention. As can be seen, fiber laser system 10' may be configured in much the same way as fiber laser system 10 (e.g., laser diode 205, optical fiber 210, TEC 300, optional mounting plate 120, chassis 400), discussed in detail above with reference to FIG. 5A, and optionally may include different/additional components, such as, but not limited to: an optional heat spreader 320. Fiber laser system 10' may include additional, fewer, and/or different elements or components from those here described, as will be appreciated in light of this disclosure. The claimed invention is not intended to be limited to any particular fiber laser system configurations, but can be used with numerous configurations in numerous applications.

In some embodiments, a heat spreader 320 optionally may be implemented to assist with temperature control/management of fiber laser system 10'. In some such cases, optional heat spreader 320 may be configured, for example, as a slab of thermally conductive material, such as, but not limited to: (1) steel; (2) aluminum; (3) copper; (4) alloys thereof; (5) diamond; and/or (6) other material capable of spreading/dissipating heat over a surface area. In some other cases, optional heat spreader 320 may be configured, for example, as an arrangement of foils of thermally conductive metal, such as, but not limited to: (1) indium; (2) copper; (3) alloys thereof; and/or (4) any other material capable of spreading and/or dissipating heat over a surface area. When included, optional heat spreader 320 may be physically and/or thermally coupled, for example, with one or more of: (1) laser diode 205; and/or (2) TEC 300. Other suitable configurations/materials for optional heat spreader 320 will depend on a given application and will be apparent in light of this disclosure.

As previously noted, an optical fiber 210 (e.g., a given grating region 212) may undergo an increase in temperature during its use (e.g., as a signal/laser light is propagated therethrough) and the performance of a fiber laser system implementing such an optical fiber 210 (e.g., the stability of its output) may decline with an increase in temperature of its componentry. Thus, and in accordance with an embodiment, the temperature of an optical fiber 210 may be controlled/managed by providing a thermal pathway from the optical fiber 210 (e.g., a heat source) to TEC 300 (e.g., a heat exchange interface). In some embodiments, such a thermal pathway may be provided, for example, by implementing a fiber laser system 10' that satisfies the following conditions: (1) optical fiber 210 is thermally coupled with fiber grating holder 110 (e.g., by physical contact in channel 116 and/or by utilizing a thermally conductive sealant 130 therein); (2) fiber grating holder 110 is thermally coupled with optional mounting plate 120; (3) optional mounting plate 120 is thermally coupled with heat spreader 320; and (4) heat spreader 320 is thermally coupled with TEC 300. Other suitable configurations for provision of a sufficient thermal pathway in fiber laser system 10' will depend on a given application and will be apparent in light of this disclosure. For example, in some embodiments, optional mounting plate 120 may be physically and/or thermally coupled with both laser diode 205 and optional heat spreader 320. Furthermore, in some embodiments, optional heat spreader 320 may be dimensioned such that it extends beyond the base of laser diode 205 and thus provides a surface to which fiber grating holder 110 may be physically and/or thermally coupled directly (e.g., adjacent laser diode 205).

As will be appreciated in light of this disclosure, various embodiments of the present invention may reduce/eliminate the need for inclusion of additional temperature control/management componentry besides a single TEC 300. In some embodiments, this may provide for advantages/benefits such as, but not limited to: (1) a reduction in system size/bulk, footprint, and/or weight; (2) an increase in system dependability, given that there are fewer components which may malfunction and/or degrade over time; (3) an increase in overall system efficiency (e.g., more precise signal wavelengths emitted; a reduction in power consumption by the system); (4) a reduction in the complexity of system design and/or interfacing; and/or (5) a decrease in the likelihood of performance degradation which otherwise may result from failure to set proper temperature settings (e.g., as a result of human error and/or equipment malfunction). Other benefits/advantages of embodiments of the present invention will depend on a given application and will be apparent in light of this disclosure.

Example Implementation Data

Figure 6:
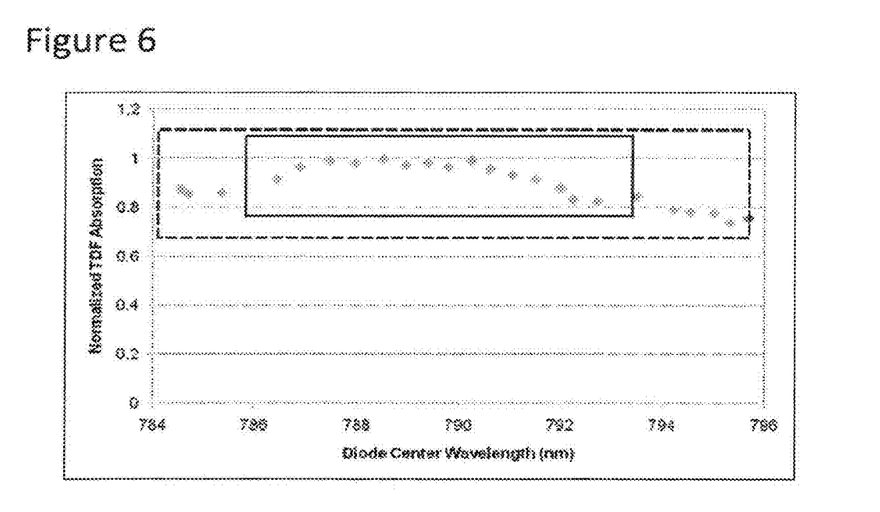
FIG. 6 is a graph of experimental, data showing normalized Tm-doped fiber (TDF) absorption as a function of diode center wavelength.
Figure 7:
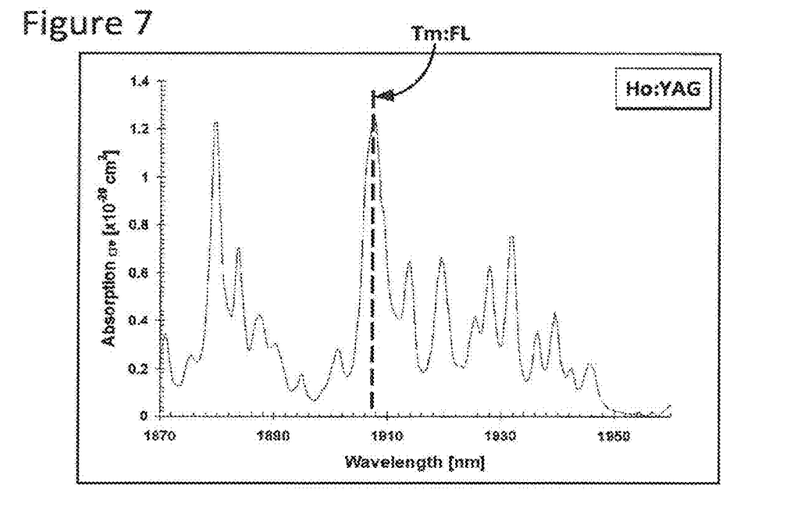
FIG. 7 is a graph of experimental data showing an absorption cross-section of a Ho:YAG laser crystal.

FIG. 6 is a graph of experimental data showing normalized Tm-doped fiber (TDF) absorption as a function of diode center wavelength. FIG. 7 is a graph of experimental data showing an absorption cross-section of a Ho:YAG laser crystal.

As can be seen from FIG. 6, a Tm-doped optical fiber has a large operating bandwidth: the solid-line box depicted in FIG. 6 represents an ideal pumping region (e.g., 785.9-793.4 nm) of that operating bandwidth, while the dashed-line box therein represents the extended pumping region (e.g., 784.1-795.7 nm) of that operating bandwidth. This large operating bandwidth may allow for increasing the temperature range on the laser diode operatively coupled to the optical fiber, for example. Given that laser diodes generally drift in wavelength by about 0.3 nm/° C., with Tm-doped fibers the full absorption window in the 790 nm spectral region is greater than about 10 nm wide. This large window allows for increasing the temperature range on the diode to more than 30° C., as compared, for example, to less than 5° C. for a non-fiber laser system.

However, as the diode wavelength changes over this range, pump absorption in the optical fiber changes slightly, which can change the laser performance over a given change in temperature. To mitigate this performance degradation, the optical fiber can be optimized to flatten out this degradation at the temperature extremes. Therefore, in addition to the laser diode, it may be desirable to temperature control/manage any fiber gratings implemented in the optical fiber to avoid laser wavelength shifting over a large temperature range. As will be appreciated, a typical fiber grating may experience a wavelength shift, for example, of about 0.014 nm/° C. Thus, as will further be appreciated, controlling/limiting the fiber grating to a 30° C. window (e.g., ±15° C.) allows for a maximum shift in the fiber grating spectrum of about 0.42 nm, which is a relatively small shift in output wavelength. However, in a system where temperature ranges vary, for example, from less than −60° C. to greater than 70° C. (e.g., more than a 100° C. window), allowing a fiber grating to free-run/operate without temperature control/management provisions may result in a spectral shift greater than about 1.4 nm, which, as will be apparent from FIG. 7, may be too large a wavelength shift for using, for example, a Tm:FL to pump a Ho:YAG laser crystal (e.g., which is optimally pumped at about 1908 nm, as demonstrated by the sharp absorption peak thereat) and/or as non-linear converter.

As fiber gratings do not have much thermal mass, physically and/or thermally coupling one or more fiber gratings to the laser diode (and/or an optionally included heat spreader) may allow, in accordance with an embodiment, for the use of a single TEC to control the temperature of both the laser diode and the fiber grating(s). Thus, and in accordance with an embodiment, a given number of fiber gratings (e.g., fiber gratings 212, 212A, 212B, etc.) may be positioned/disposed within one or more fiber grating holders (e.g., fiber grating holder 110/110') and a thermal pathway may be provided from the one or more fiber grating holders to a single thermoelectric cooler (e.g., TEC 300) (or other suitable temperature control/management componentry). In some cases, the fiber gratings may be allowed to operate within the same temperature range, for example, as the laser diode; that is, the one or more fiber gratings can be temperature controlled using a single TEC.

For example, in some embodiments, such a thermal pathway may be achieved by physically and/or thermally coupling the fiber grating holders 110/110' directly to one or more laser diodes 205, which in turn are physically and/or thermally coupled to the TEC 300.

In some alternative embodiments, such a thermal pathway may be achieved by physically and/or thermally coupling the fiber grating holders 110/110' to one or more optional mounting plates 120, which in turn are physically and/or thermally coupled to one or more laser diodes 205, which in turn are physically and/or thermally coupled to the TEC 300.

In some alternative embodiments, such a thermal pathway may be achieved by physically and/or thermally coupling the fiber grating holders 110/110' directly to the one or more laser diodes 205 and/or an optional heat spreader 320, which in turn is physically and/or thermally coupled to the one or more laser diodes 205 and/or TEC 300.

In some alternative embodiments, such a thermal pathway may be achieved by physically and/or thermally coupling the fiber grating holders 110/110' to one or more optional mounting plates 120, which in turn are physically and/or thermally coupled to one or more laser diodes 205 and/or an optional heat spreader 320, which in turn is physically and/or thermally coupled to the one or more laser diodes 205 and/or TEC 300.

Some such configurations, in accordance with an embodiment, may allow for stable operation of the fiber laser (e.g., in output power and/or wavelength) over a very large temperature range (e.g., within a 100° C. window, or greater). In some such embodiments, the fiber grating(s) may not require, for example, an athermal package.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system comprising:
    a fiber laser comprising:
        a laser diode; and
        an optical fiber optically coupled with the laser diode, wherein the optical fiber includes a first fiber Bragg grating and a second fiber Bragg grating;
    a thermal control component at least one of physically and thermally coupled with the laser diode; and
    a first fiber grating holder comprising an elongate body of thermally conductive material having a first channel formed therein and configured to receive the first fiber Bragg grating of the optical fiber, wherein a depth of the first channel of the first fiber grating holder is greater than or equal to a diameter of the optical fiber, and wherein the first fiber grating holder is at least one of physically and thermally coupled with at least one of the laser diode and the thermal control component; and
    a second fiber grating holder comprising an elongate body of thermally conductive material having a second channel formed therein and configured to receive the second fiber Bragg grating of the optical fiber, wherein a depth of the second channel of the second fiber grating holder is greater than or equal to the diameter of the optical fiber, and wherein the second fiber grating holder is at least one of physically and thermally coupled with at least one of the laser diode and the thermal control component.

2. The system of claim 1, wherein at least one of:
    the laser diode comprises an ytterbium (Yb)-doped laser medium or a thulium (Tm)-doped laser medium; and
    the optical fiber comprises at least one of a silica glass fiber, a phosphate glass fiber, a fluoride glass fiber, a chalcogenide glass fiber, and a germanate glass fiber.

3. The system of claim 1, wherein the thermal control component comprises a thermoelectric cooler, an air-cooled heat exchanger, or a water-cooled cold plate.

4. The system of claim 1, wherein at least one of the first and second channels is configured to receive a quantity of at least one of a thermally conductive epoxy and a thermally conductive thermoplastic/thermoset therein.

5. The system of claim 1, wherein the first fiber Bragg grating comprises a high-reflectivity fiber Bragg grating and the second fiber Bragg grating comprises a partial-reflectivity fiber Bragg grating.

6. The system of claim 5 further comprising a gain fiber operatively coupled to the optical fiber, wherein the gain fiber comprises a core that has been doped with a rare earth element, and wherein the gain fiber is disposed between the high-reflectivity fiber Bragg grating and the partial-reflectivity fiber Bragg grating of the optical fiber.

7. The system of claim 1 further comprising a heat spreader, wherein the heat spreader is:
    at least one of physically and thermally coupled with the laser diode and the thermal control component; and
    at least one of physically and thermally coupled with at least one of the first and second fiber grating holders.

8. The system of claim 7, wherein the heat spreader comprises an arrangement of foils comprising at least one of indium (In), copper (Cu), and an alloy thereof.

9. The system of claim 7 further comprising a mounting plate physically coupled with at least one of the first and second fiber grating holders and at least one of physically and thermally coupled with the heat spreader.

10. The system of claim 1 further comprising a mounting plate physically coupled with at least one of the first and second fiber grating holders and at least one of physically and thermally coupled with the laser diode.

11. A system comprising:
    a fiber laser comprising:
        a laser diode; and
        an optical fiber optically coupled with the laser diode, wherein the optical fiber includes a high-reflectivity fiber Bragg grating, a partial-reflectivity fiber Bragg grating, and a gain fiber there between;
    a thermoelectric cooler at least one of physically and thermally coupled with the laser diode;
    a mounting plate thermally coupled with the thermoelectric cooler;
    a first fiber grating holder at least one of physically and thermally coupled with the mounting plate, wherein the first fiber grating holder comprises an elongate body of thermally conductive material having a first channel formed therein, wherein the first channel is configured to receive the high-reflectivity fiber Bragg grating and to receive a quantity of at least one of a thermally conductive epoxy and a thermally conductive thermoplastic/thermoset therein, and wherein a depth of the first channel is greater than or equal to a diameter of the optical fiber; and
    a second fiber grating holder at least one of physically and thermally coupled with the mounting plate, wherein the second fiber grating holder comprises an elongate body of thermally conductive material having a second channel formed therein, wherein the second channel is configured to receive the partial-reflectivity fiber Bragg grating and to receive a quantity of at least one of a thermally conductive epoxy and a thermally conductive thermoplastic/thermoset therein, and wherein a depth of the second channel is greater than or equal to the diameter of the optical fiber.

12. The system of claim 11 further comprising at least one of a holmium-doped yttrium aluminum garnet (Ho:YAG) laser crystal and a non-linear converter configured to be optically pumped by the fiber laser.

13. A system comprising:
a fiber laser comprising:
  a laser diode; and
  an optical fiber optically coupled with the laser diode, the optical fiber including a fiber Bragg grating;
a fiber grating holder comprising an elongate body of thermally conductive material having a channel formed therein, the channel configured to receive the fiber Bragg grating of the optical fiber and having a depth greater than or equal to a diameter of the optical fiber;
a thermal control component thermally coupled with the laser diode and the fiber grating holder and configured to control the temperature of the laser diode and the fiber Bragg grating of the optical fiber; and
a heat spreader disposed between the thermal control component and the laser diode, wherein the heat spreader is:
  physically coupled with the thermal control component and the laser diode; and
  thermally coupled with the fiber grating holder, the laser diode, and the thermal control component.

14. The system of claim 13, wherein the heat spreader comprises a slab of at least one of steel, aluminum (Al), copper (Cu), diamond, and an alloy thereof.

15. The system of claim 13 further comprising a mounting plate, wherein the mounting plate is:
physically coupled with the laser diode and the fiber grating holder; and
thermally coupled with the fiber grating holder, the laser diode, and the thermal control component.

16. The system of claim 13, wherein the fiber grating holder is physically coupled with the heat spreader.

17. The system of claim 13, wherein the heat spreader comprises an arrangement of foils comprising at least one of indium (In), copper (Cu), and an alloy thereof.

18. The system of claim 13 further comprising a mounting plate, wherein the mounting plate is:
physically coupled with the heat spreader and the fiber grating holder; and
thermally coupled with the fiber grating holder, the heat spreader, and the thermal control component.

19. The system of claim 13 further comprising a quantity of at least one of a thermally conductive epoxy and a thermally conductive thermoplastic/thermoset disposed within the channel of the fiber grating holder having the fiber Bragg grating of the optical fiber therein.

20. The system of claim 13, wherein the laser diode comprises an ytterbium (Yb)-doped laser medium or a thulium (Tm)-doped laser medium.

21. The system of claim 13, wherein the optical fiber comprises at least one of a silica glass fiber, a phosphate glass fiber, a fluoride glass fiber, a chalcogenide glass fiber, and a germanate glass fiber.

22. The system of claim 13, wherein the thermal control component comprises a thermoelectric cooler, an air-cooled heat exchanger, or a water-cooled cold plate.

23. The system of claim 13, wherein the thermally conductive material of the fiber grating holder comprises at least one of a thermally conductive metal, a thermally conductive composite, and a thermally conductive ceramic.

24. The system of claim 13 further comprising at least one of a holmium-doped yttrium aluminum garnet (Ho:YAG) laser crystal and a non-linear converter configured to be optically pumped by the fiber laser.

25. The system of claim 7, wherein the heat spreader comprises a slab of at least one of steel, aluminum (Al), copper (Cu), diamond, and an alloy thereof.

* * * * *